3,046,257
SEBACAMIDE-P-XYLYLENEDIAMIDE COPOLYMER

Robert D. Evans, West Chester, and Arthur J. Yu, Swarthmore, Pa., assignors to American Viscose Corporation, Philadelphia, Pa., a corporation of Delaware
No Drawing. Filed Apr. 6, 1959, Ser. No. 804,068
6 Claims. (Cl. 260—78)

This invention relates to isomorphous copolyamides. More particularly this invention relates to isomorphous copolyamides of sebacic acid, p-xylylene diacetic acid and certain polymethylenediamines.

As a general rule, if part of the monomer used in making a homopolymer by a condensation reaction is replaced by a second monomer and a copolymer is formed comprising the first and second monomers, the melting point of the copolymer is lower than the melting point of the homopolymer of the first monomer. Also, the softness, flexibility and solubility of the copolymer is greater. It is believed that the second monomer that is copolymerized interrupts the chain regularity of the first monomer and introduces some longitudinal disorder in the copolymer. As a result, the degree of crystallinity of the copolymer is reduced and the copolymer is non-isomorphous. A measure of index of the crystallinity of the copolymer and whether it is isomorphous or non-isomorphous is the melting point. However, certain monomers can be copolymerized in certain proportions to form isomorphous copolymers. The melting point of the copolymer is either equal to or greater than the melting point of the homopolymer of one of the monomers. The isomorphous copolymer may be considered as a homopolymer that has had a certain proportion of the monomer replaced by a second monomer. If the second monomer is such that it does not disturb the size, shape, geometrical pattern or crystalline lattice of the copolymer the resulting copolymer is isomorphous.

This invention has for its object to provide isomorphous copolymers of sebacic acid, p-xylylenediacetic acid and normal polymethylenediamines having six to twelve carbon atoms.

In accordance with the invention it has now been found that isomorphous polymethylenesebacamide and polymethylene-p-xylylenediacetamide copolymers may be produced. The copolymer may be composed of certain proportions of the monomers and the polymethylenediamine that is used has from six to twelve carbon atoms inclusive.

The copolymer of this invention is of high molecular weight and is normally solid and may be formed into fibers, films and molded articles.

In the making of the copolymer in general, equal mol proportions of the polymethylenediamine and sebacic acid are reacted together to form the corresponding diammonium salt, polymethylenediammonium sebacate. Likewise equal mol proportions of p-xylylenediacetic acid and the same polymethylenediamine are reacted together to form the corresponding polymethylenediammonium p-xylylenediacetate. The salts which are crystalline are separately recovered and are washed and dried. The isomorphous copolymer is formed by condensing together certain mol proportions of the diammonium sebacate and diammonium p-xylylenediacetate. The mol proportions in which the two salts are mixed and reacted together are the mol proportions in which the sebacamide and the p-xylylenediacetamide will be present in the resulting isomorphous copolymer. The mixed salts are covered with m-cresol and are heated to a high temperature at reduced pressure until the copolymerization is completed. The water that is formed is distilled off, then the m-cresol is then distilled off. The copolymer that is recovered is broken up and ground to particle size.

In making the copolymer of this invention part of the polymethylenediammonium sebacate that would be reacted alone if the polymethylenesebacamide homopolymer were to be made is replaced by the diammonium-p-xylylenediacetate and the two copolymerized together.

The copolymer may be considered as a homopolymer of the polymethylenesebacamide in which part of the polymethylenesebacamide is replaced by polymethylene-p-xylylenediacetamide.

The polymethylene chain is present throughout the polymer and the acid residue is the acid residue of both the sebacic and p-xylylenediacetic acid. Therefore, the copolymer may also be considered as a homopolymer in which the sebacic acid residue is replaced in part by p-xylylenediacetic acid residue.

In the present invention from 5 to 95 mol percent of the polymethylenesebacamide may be replaced by the polymethylene-p-xylylenediacetamide. The resulting copolymer which is isomorphous contains the polymethylenesebacamide and the polymethylene-p-xylylenediacetamide in the amount that the polymethylenesebacamide has been replaced. The copolymer contains from 5 to 95 mol percent polymethylenesebacamide and 95 to 5 mol percent of the polymethylene-p-xylylenediacetamide. Expressed in another way, of the total acid residue in the copolymer the sebacic acid residue may be 5 to 95 mol percent and the p-xylylenediacetic acid residue may be 95 to 5 mol percent.

In the following example which is illustrative of the invention an isomorphous copolymer of 60 mol percent octamethylenesebacamide and 40 mol percent octamethylene-p-xylylenediacetamide is formed.

Example 1

Quantities of octamethylenediammonium sebacate and octamethylenediammonium-p-xylylenediacetate which are each formed by reacting octamethylenediamine with the respective acids are separately weighed and thoroughly mixed together in such proportions to form a mixture containing 60 mol percent octamethylenediammonium sebacate and 40 mol percent octamethylenediammonium-p-xylylenediacetate. The mixture is transferred to a reaction vessel and enough m-cresol is added to cover the reactants. The reaction vessel is immersed in a silicone oil bath and heating is started.

The heating cycle consists of four stages: (a) Heating at around 100° until a homogeneous solution is obtained. This takes about 15 to 30 minutes. (b) Raise the temperature gradually to 160–180° C. Water begins to distill over at this stage. The solution becomes more and more viscous and gradually turns opaque. This usually takes place after one to two hours. (c) Before the solution solidifies, temperature is raised to 230–260° to keep the copolymer solution in a molten state. The pressure is gradually reduced to remove the m-cresol by distillation. As more and more m-cresol is removed, the copolymer turns opaque and is about to solidify. (d) The pressure is reduced to below 0.5 mm. and the temperature is raised to 280–320°, depending on the melting point of the copolymer. These conditions are maintained for four hours. At this stage, the last trace of m-cresol is removed, and the copolymerization is nearly driven to completion.

At the end of copolymerization, the heating is discontinued, the evacuation stopped, and nitrogen is admitted to the system. The copolymer in the reaction flask is allowed to cool in the oil bath. This slow rate of cooling gives a well annealed copolymer, which does not adhere to the wall of the vessel. The glass vessel is then removed from the oil bath, and broken to remove the copolymer. The copolymer is chipped to small pieces, which are ground in a small Wiley mill, using a 20 mesh screen.

The determination of copolymer melting point is made by observing particles of the copolymer between crossed polarizers on the hot stage of a microscope. The melting point is taken as the temperature at which the last trace of crystallinity, as evidenced by birefringence, completely disappeared.

The resulting octamethylenesebacamide and octamethylene-p-xylylenediacetamide copolymer is composed of 60 mol percent octamethylene-p-xylylenediacetamide and 40 mol percent octamethylenesebacamide. The melting point of the resulting polymer is found to be approximately 236° C.

The homopolymer octamethylenesebacamide has a melting point of 210° C. which increases to approximately 292° as the sebacamide is replaced by octamethylene-p-xylylenediacetamide until all of the sebacamide has been replaced.

The isomorphous copolymer containing other amounts of the two monomers may be made in the same manner by changing the proportions of the monomers. Likewise, isomorphous copolymers of the two acids and the other diamines, hexamethylene, heptamethylene, nonamethylene, decamethylene, undecamethylene and dodecamethylene may be produced.

We claim:

1. An isomorphous polymethylenesebacamide polymethylene-p-xylylenediacetamide copolymer composed of 5 to 95 mol percent of polymethylenesebacamide and 95 to 5 mol percent polymethylene-p-xylylenediacetamide and wherein the polymethylene contains 6 to 12 carbon atoms.

2. An isomorphous hexamethylenesebacamide hexamethylene-p-xylylenediacetamide copolymer composed of 5 to 95 mol percent of hexamethylenesebacamide and 95 to 5 mol percent hexamethylene-p-xylylenediacetamide.

3. An isomorphous nonamethylenesebacamide nonamethylene-p-xylylenediacetamide copolymer composed of 5 to 95 mol percent of nonamethylenesebacamide and 95 to 5 mol percent nonamethylene-p-xylylenediacetamide.

4. An isomorphous decamethylenesebacamide decamethylene-p-xylylenediacetamide copolymer composed of 5 to 95 mol percent of decamethylenesebacamide and 95 to 5 mol percent decamethylene-p-xylylenediacetamide.

5. An isomorphous undecamethylenesebacamide undecamethylene-p-xylylenediacetamide copolymer composed of 5 to 95 mol percent of undecamethylenesebacamide and 95 to 5 mol percent undecamethylene-p-xylylenediacetamide.

6. An isomorphous dodecamethylenesebacamide dodecamethylene-p-xylylenediacetamide copolymer composed of 5 to 95 mol percent of dodecamethylenesebacamide and 95 to 5 mol percent dodecamethylene-p-xylylenediacetamide.

References Cited in the file of this patent
UNITED STATES PATENTS

| | | |
|---|---|---|
| 2,130,947 | Corothers | Sept. 20, 1938 |
| 2,918,454 | Graham | Dec. 22, 1959 |

FOREIGN PATENTS

| | | |
|---|---|---|
| 892,846 | France | Jan. 17, 1944 |
| 804,225 | Great Britain | Nov. 12, 1958 |